United States Patent [19]

Martin

[11] 3,737,126
[45] June 5, 1973

[54] EJECTION SEAT ESCAPE SYSTEM
[76] Inventor: James Martin, Southland Manor, Southland Road, Uxbridge, England
[22] Filed: Mar. 23, 1971
[21] Appl. No.: 127,125

[30] Foreign Application Priority Data
Apr. 15, 1970 Great Britain.................18,039/70

[52] U.S. Cl. .............................244/151 B, 24/73 PH
[51] Int. Cl. .........................................B64d 17/30
[58] Field of Search ....................244/151 R, 151 A, 244/151 B, 147, 141, 122; 24/73 PH, 81 AG

[56] References Cited
UNITED STATES PATENTS
| | | | |
|---|---|---|---|
| 3,658,281 | 4/1972 | Gaylord | 244/151 A |
| 3,632,066 | 1/1972 | Brown | 244/151 A |
| 2,988,797 | 6/1961 | Gaylord | 244/151 A X |
| 2,802,252 | 8/1957 | Gaylord | 244/151 A X |
| 3,404,439 | 10/1968 | Jones et al. | 244/151 X |

Primary Examiner—Duane A. Reger
Assistant Examiner—Carl A. Rutledge
Attorney—Kurt Kelman

[57] ABSTRACT

The invention concerns release mechanisms and parachute harnesses having such mechanisms, the purpose of the invention being to permit donning of a harness by a person before entering an aircraft or like vehicle and to permit release of the parachute therefrom rapidly in certain emergency conditions, the mechanism comprising a release mechanism comprising a first coupling part; a second coupling part; clasping means adapted to receive and releasably retain said second coupling part; directly manually operable release means for effecting release of said clasping means being provided on the first coupling part; and second release means also for releasing said clasping means; a remotely positioned release member; said second release means being arranged to operate in response to pressure fluid on actuation of said remotely positioned release member.

1 Claim, 3 Drawing Figures

PATENTED JUN 5 1973 3,737,126

Inventor
JAMES MARTIN

By Kurt Kelman
AGENT

EJECTION SEAT ESCAPE SYSTEM

This invention concerns parachute harnesses and release mechanisms therefor. The invention particularly concerns parachute harnesses for use by airmen using aircraft provided with ejection seats. The term "aircraft" should be understood to embrace space craft, rotor craft such as helicopters, and other like vehicles.

For many years parachute harnesses have been fitted with a quick release box which, when the harness is donned, lies adjacent either the abdomen or chest of the wearer. Such an arrangement has generally proved to be very satisfactory but in such harnesses the harness straps pass about the limbs and torso of the wearer and, on release of the quick release box, the straps are freed and the whole harness separates from the wearer and is carried away with the parachute.

While such harnesses have proved to be very satisfactory for parachutists, when this type of harness is used by an airman it is necessary for the airman to carry out a substantial amount of pre-flight adjustment of the harness after he has entered his aircraft to ensure that the harness is correctly tensioned about his body as such harnesses normally remained in the aircraft and were permanently attached to a parachute pack. Such adjustment is tedious and time consuming, especially in present day military aircraft where cockpit space is invariably confined, and as a result of the various difficulties in carrying out this adjustment procedure airmen are inclined not to carry out the same.

Failure to carry out a correct adjustment procedure can result in injury (often severe) of the airman when he leaves his aircraft in an emergency and, because of this practical difficulty, efforts have been made to design a harness which may be donned by an airman and adjusted correctly prior to entering his aircraft. Harnesses of this kind have become known as torso or skeletal harnesses and comprise a series of torso embracing straps usually maintained in a tidy condition by being associated with a waistcoat worn by the airman. In such harnesses, terminal end portions of shoulder straps are provided which carry means whereby the lift webs or parachute risers straps of a parachute may be readily releasably coupled thereto.

As has been stated hereinbefore, in present day aircraft, it is usual to store a parachute pack housing the shroud lines and canopy of the parachute in the aircraft, for example in a storage compartment provided in an ejection seat and, when a torso or skeletal harness (as referred to above) is used, the airman may enter his aircraft with an already correctly adjusted harness positioned about his body and may then merely readily and rapidly attach such end portions of the shoulder straps of his harness by said releasable means to said lift webs or parachute risers.

With a torso or skeletal type of harness, when a parachute descent has been accomplished, release of the parachute from the airman would not be effected by the airman removing his harness completely, as would be the case when using the established type of parachute harness with a quick release box as described hereinbefore, but such parachute would merely be disconnected by releasing the said means at the terminal end portions of the torso harness shoulder straps so that the torso harness remains on the airman but the parachute and its lift webs or risers separate from such harness.

To provide correct connection (and for safe disconnection) between said lift webs and shoulder straps, the releasable means require to be located adjacent the shoulders of the airman and this results in one particular disadvantage, namely it is not as easy for the airman rapidly to effect release of means provided adjacent his shoulders as it is to effect release of a box located adjacent his abdomen.

It has been found that, when an airman lands in high surface wind conditions on water, there is a severe risk of his drowning and, when landing in rough terrain, there is a serious risk of major injury for the simple reason that separation of the parachute and its lift webs or risers from the harness cannot be effected sufficiently quickly because of the location of the shoulder strap release means.

It will be appreciated that the means for attaching the parachute risers or lift webs to the harness shoulder straps normally comprise two or more relatively small couplings which would inevitably be relatively difficult to release especially by cold fingers of gloved hands. This difficulty is accentuated by the fact that, on landing in such high wind conditions, the couplings are inclined to be moved upwardly above (and sometimes rearwardly of) their normal location to a particularly remote position not easily reached by the airman's hands.

One object of this invention is to provide a release mechanism in a parachute harness of the type which may be donned separately of the packed parachute and which will permit ready separation of the parachute and its lift webs or risers from the harness shoulder straps worn by the airman even in conditions of landing in water or on the ground in high wind conditions.

This object is accomplished in accordance with the invention with a pair of first connector parts secured to the harness shoulder straps and a pair of second connector parts secured to the parachute lift webs, the first and second connector parts forming a pair of releasable connectors. Clasping means releasably secure the first and second connector parts of each connector. The clasping means may be selectively released by a first, directly manually operable release means or a second, fluid pressure responsive release means. The second release means includes a supply of pressure fluid, a handle located remote from the first release means against the chest or abdomen of the airman and operable to release pressure fluid from the supply, a first conduit coupled to the handle and the first connector part of one connector for delivering the released pressure fluid upon operation of the handle, the delivered pressure fluid releasing the clasping means of the one connector, and a second conduit passing from the first connector part of the one connector to the first connector part of the other connector to transmit the delivered pressure fluid for releasing the clasping means of the other connector.

In order that the invention may be more readily understood, and further features of the same more readily appreciated, one embodiment of parachute harness and pack having a release mechanism in accordance with this invention will now be described by way of example and with reference to the accompanying drawings in which.

Figure 1:
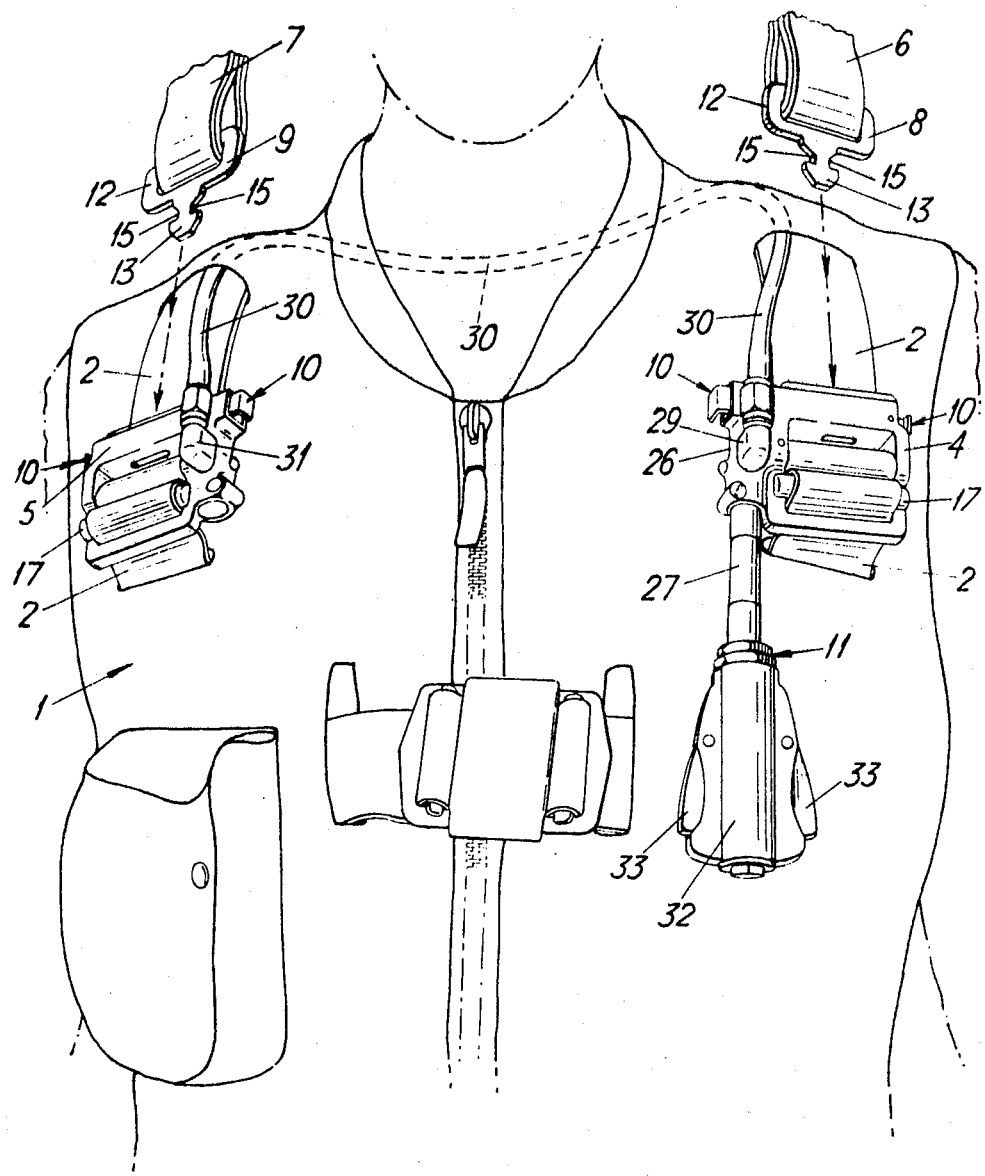
FIG. 1 is a fragmentary diagrammatic front elevation of the chest and abdomen of an airman wearing a torso or skeletal harness provided with a release mechanism in accordance with this invention including releasable connectors.
Figure 2:
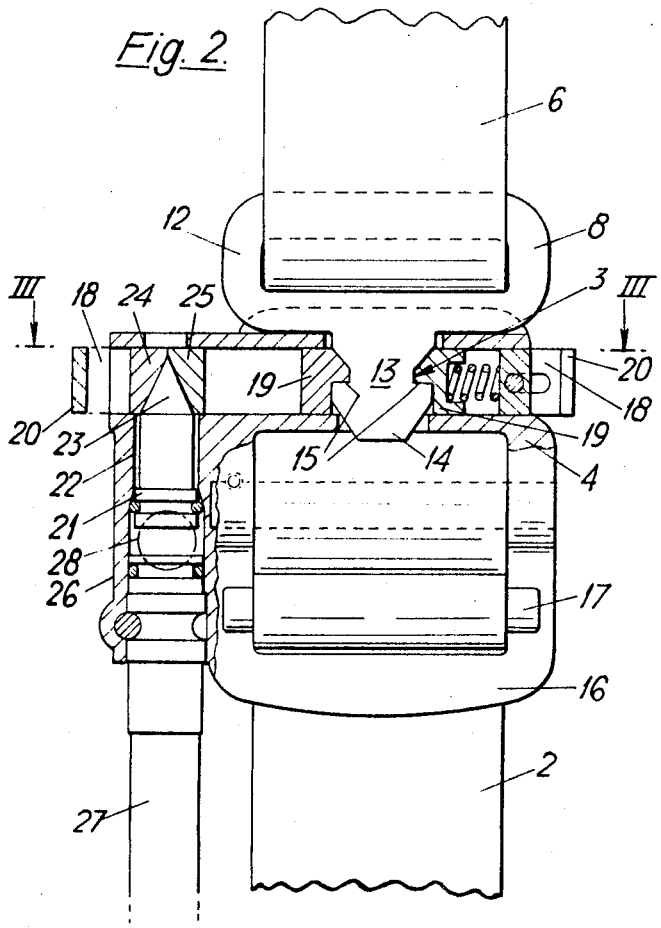
FIG. 2 is a partly sectioned fragmentary view of one of the releasable connectors shown in FIG. 1.
Figure 3:
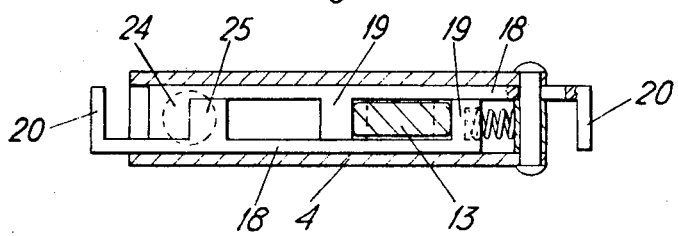
FIG. 3 is a section on the line III—III of FIG. 2.

The parachute harness comprises a torso or skeletal harness of known type having a plurality of harness belts which embrace the torso of the airman and which are retained in a tidy condition by a tunic generally designated 1 worn by the airman, such harness being provided with two shoulder straps 2 which pass over the respective two shoulders of the airman and each of such straps is connected to a first part of a two-part connector. The connectors are generally designated 3 and the first parts 4 and 5.

A parachute pack (not shown) is provided to contain a parachute canopy and shroud lines and extending from the pack are a pair of lift webs 6, 7 which respectively carry at their terminal end portions a second part of said two-part connectors, these second parts being designated 8, 9. The arrangement is such that the lift webs 6, 7 may respectively be coupled to the first parts 4, 5 of the connectors 3 secured adjacent the shoulders of the airman.

When using a harness of the kind described above the airman seats himself in his aircraft (for example in an ejection seat) and he couples the second connector parts 8, 9 carried by the lift webs 6, 7 to the first parts 4, 5 so that he is securely connected to his parachute pack on ejection and on his separation, during descent, from his ejection seat, he is securely and correctly coupled to his parachute and can make a normal parachute descent.

First release means (generally designated 10) are provided on the first connector parts 4, 5 to enable the airman to release the second parts 8, 9 of the connectors from the first parts 4, 5 when he leaves his aircraft under normal conditions and furthermore a release member (generally designated 11) is provided to enable him to separate his harness shoulder straps 2 from the lift webs 6, 7 and parachute by separation of the two parts of each connector by operation of said further release member 11 in an emergency, such as on reaching ground or water after a parachute descent.

The second connector part 8, 9 merely comprises a closed ring 12 through which a left web 6, 7 of a parachute is passed and secured, and such ring is provided with a tongue 13 having a chamfered entry portion 14 which protrudes from an intermediate part having its side edges rebated at 15. This tongue 13 is adapted to be introduced into a mouth of the body of the first part 4, or 5.

This first part (4 or 5) of each connector again comprises a ring 16 through which passes the end portion of the harness shoulder strap 2, a sliding bar 17 being slidably located across said ring to provide means whereby the strap 2 may be adjusted with respect to the first part. Carried by this ring 16 is the main body portion of the first part which defines the mouth and which carries a pair of diametrically opposed longitudinally movable spring biassed plungers 18 having notched heads 19 (which constitute clasping means) which are adapted to engage the rebates 15 of said tongue 13 on the second connector part 8 or 9.

The plungers 18 are provided with portions which are engaged by directly operable mechanical release means 20, depression of such release means 20 resulting in retraction of the plungers 18 to a position in which the tongue 13 is released from the notched heads 19. Broadly speaking each of the connectors 3 is of the same basic construction as the connector described and claimed in my U.K. Pat. No. 796,877.

In this embodiment the plungers 18 are provided with an additional facility whereby they may be simultaneously retracted in response to movement of a piston 21 movable in a cylinder 22 under the influence of pressure fluid. The piston 21 is provided with an end portion 23 which engages parts 24, 25 of the plungers 18 in such a way that movement in one direction causes the heads 19 to retract. The cylinder 22 is formed in a cylindrical body 26 integrally formed with the first part 4 and to the side of said ring 16.

The interior of the body 26 is sealingly coupled to a flexible conduit 27 which extends away from the first part to said further remote release member generally designated 11 to be described hereinafter.

The cylinder 22 is provided with a side port 28 which is provided to permit egress of pressure fluid from the cylinder once such pressure fluid has entered the cylinder 22 through the conduit 27. The outlet 29 of the port 28 is in turn connected to a flexible conduit 30 which extends away from the first part 4 of one connector upwardly over the shoulder of the airman across the airman's back in the vicinity of his neck and down to an inlet 31 of a cylinder provided on an identical first part 5 of the other connector 3, the inlet 31 being located in the position of the outlet 29. The end of the cylinder which is provided on the connector part 4 to receive the pressure fluid from conduit 27 is, in the case of the connector part 5, sealed off.

In operation, the pressure fluid entering the cylinder 22 from the conduit 27 causes the piston 21 to move towards the parts 24, 25 to release of the tongue 13 of the second connector part 8 by causing retraction of the plungers 18 and such movement of the piston 21 uncovers the outlet port 28, which permits the pressure fluid to pass through the conduit 30 into inlet 31 of the first connector part 5 actuating a corresponding plunger which, in turn, causes release of the plungers of said part 5. Thus, virtually simultaneous release of the second parts 8, 9 from the first parts 4, 5 results from merely causing pressure fluid to pass into the conduit 27.

Introduction of pressure fluid in this manner is effected by causing actuation of release member 11 which is constituted by a handle 32 having release levers 33 adapted to be grasped and operated by the airman. This results either in release of pressure fluid from a compressed gas storage container or alternatively causes release of a spring biassed firing pin which strikes a gas generating cartridge in known manner.

Thus, in an emergency, only one action is necessary by the airman to release both his lift webs 6, 7 and thus his parachute from his main torso harness, and that is the actuation of handle 32 positioned at a convenient point on his body, for example in the vicinity of his chest or abdomen, the shape of handle and the positioning thereof being chosen in such a way that it may be actuated by either of the airman's hands readily.

However, when the airman desires to disconnect his lift webs 6, 7 from his torso harness when leaving his aircraft (i.e. in conditions where there is not emergency) it is merely necessary for him to depress sequentially the manually operable release means 20 on each of the first parts 4, 5 of the two, two part connectors.

I claim:

1. A harness adapted to be worn by an airman and having shoulder straps and solely the shoulder straps to be secured to lift webs of a parachute, comprising
   1. a pair of first connector parts secured to the harness shoulder straps,
   2. a pair of second connector parts secured to the parachute lift webs,
      a. the first and second connector parts forming a pair of releasable connectors,
   3. clasping means releasably securing the first and second connector parts of each of the connectors,
   4. a first, directly manually operable release means for releasing the clasping means between the first and second connector parts of each connector, and
   5. a second, fluid pressure responsive release means for releasing the clasping means between the first and second connector parts of each connector, the second release means including
      a. a supply of pressure fluid,
      b. a handle located remote from the first release means against the chest or abdomen of the airman and operable to release pressure fluid from said supply,
      c. a first conduit coupled to the handle and to the first connector part of one of the connectors for delivering the released pressure fluid upon operation of the handle, the delivered pressure fluid releasing the clasping means of the one connector, and
      d. a second conduit passing from the first connector part of the one connector to the first connector part of the other connector to transmit the delivered pressure fluid for releasing the clasping means of the other connector whereby the clasping means of the connectors may be selectively released by the directly manually or the pressure fluid responsive release means.

* * * * *